United States Patent
Chuang

(10) Patent No.: US 9,867,027 B2
(45) Date of Patent: Jan. 9, 2018

(54) APPARATUSES AND METHODS FOR PROXIMITY-BASED SERVICE (PROSE) USER EQUIPMENT (UE)-TO NETWORK RELAY

(71) Applicant: Acer Incorporated, New Taipei (TW)

(72) Inventor: Ming-Dao Chuang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 78 days.

(21) Appl. No.: 14/918,717

(22) Filed: Oct. 21, 2015

(65) Prior Publication Data

US 2016/0330603 A1 Nov. 10, 2016

Related U.S. Application Data

(60) Provisional application No. 62/158,629, filed on May 8, 2015.

(51) Int. Cl.
*H04L 12/26* (2006.01)
*H04W 8/00* (2009.01)
(Continued)

(52) U.S. Cl.
CPC ........ *H04W 8/005* (2013.01); *H04B 7/15507* (2013.01); *H04W 56/001* (2013.01);
(Continued)

(58) Field of Classification Search
None
See application file for complete search history.

(56) References Cited

U.S. PATENT DOCUMENTS

2015/0358894 A1* 12/2015 Berggren ............... H04W 48/16
455/434
2016/0044620 A1* 2/2016 Bagheri ................ H04W 24/10
370/252
(Continued)

FOREIGN PATENT DOCUMENTS

| EP | 2 833 694 | 2/2015 |
| WO | WO 2014/086204 A1 | 6/2014 |
| WO | WO 2015/015242 | 2/2015 |

OTHER PUBLICATIONS

Panasonic; "Rough synchronization procedurein D2D;" 3GPP TSG RAN WG1 Meeting #78; Aug. 2014; pp. 1-4.
(Continued)

*Primary Examiner* — Minh-Trang Nguyen
(74) *Attorney, Agent, or Firm* — McClure, Qualey & Rodack, LLP

(57) ABSTRACT

A mobile communication device located within a radio signal coverage of a service network to serve as a relay User Equipment (UE) for Proximity-based Service (ProSe) UE-to-network relay is provided. The mobile communication device includes a wireless transceiver and a controller. The wireless transceiver performs wireless transmission and reception to and from the service network and a remote UE which is located out of the radio signal coverage of the service network. The controller transmits a Device-to-Device (D2D) Synchronization Signal (D2DSS) to the remote UE via the wireless transceiver in response to receiving a relay discovery message from the remote UE via the wireless transceiver, and requests radio resource allocation from the service network for the remote UE via the wireless transceiver in response to receiving a Direct Communication Request message from the remote UE via the wireless transceiver.

10 Claims, 6 Drawing Sheets

(51) Int. Cl.

| | | |
|---|---|---|
| | *H04B 7/155* | (2006.01) |
| | *H04W 56/00* | (2009.01) |
| | *H04B 7/15* | (2006.01) |
| | *H04W 48/12* | (2009.01) |
| | *H04W 84/04* | (2009.01) |
| | *H04W 88/04* | (2009.01) |

(52) U.S. Cl.
CPC ........... *H04W 56/0095* (2013.01); *H04B 7/15* (2013.01); *H04W 48/12* (2013.01); *H04W 84/047* (2013.01); *H04W 88/04* (2013.01)

(56) References Cited

U.S. PATENT DOCUMENTS

2016/0127963 A1*  5/2016  Masini .................. H04W 12/08
                                                                370/331
2016/0269185 A1*  9/2016  Stojanovski .......... H04L 9/3247

OTHER PUBLICATIONS

Samsung; "D2D silent and scanning period for reselection procedure," 3GPP TSG RAN WG1 Meeting #79; Nov. 2014; pp. 1-12.
Nokia Corporation, Nokia Networks; "Basic synchroniation procedure for D2D operation;" 3GPP TSG-RAN WG1 Meeting #78bis; Oct. 2014; pp. 1-5.
Chinese language office action dated Feb. 21, 2017, issued in application No. TW 105104556.
European Office Action dated Mar. 5, 2017, issued in application No. 15 195 888.1-1854.
"Disscussion on Architecture and Resource Allocation for ProSe UE-to-Network Relay;" 3GPP TSG-RAN WG2 #89bis; Apr. 2015; pp. 1-4.

* cited by examiner

APPARATUSES AND METHODS FOR PROXIMITY-BASED SERVICE (PROSE) USER EQUIPMENT (UE)-TO NETWORK RELAY

CROSS REFERENCE TO RELATED APPLICATIONS

This Application claims priority of U.S. Provisional Application No. 62/158,629, filed on May 8, 2015, the entirety of which is incorporated by reference herein.

BACKGROUND OF THE APPLICATION

Field of the Application

The application generally relates to wireless communications, and more particularly, to relay in Proximity-based Service (ProSe) communication.

Description of the Related Art

With growing demand for ubiquitous computing and networking, various wireless technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, and Time-Division LTE (TD-LTE) technology, etc. By employing one of the wireless technologies, a mobile communication device (which may be referred to as User Equipment (UE)) may wirelessly connect to a service network for accessing the Internet or obtaining mobile services, including the Proximity-based Service (ProSe), anytime and anywhere. The ProSe represents an enormous recent social-technological trend.

Using LTE technology as an example, the ProSe is first introduced in Release 12 of the 3rd Generation Partnership Project (3GPP) specifications. A ProSe-enabled UE may discover other ProSe-enabled UEs in its vicinity by using only the capabilities of the two UEs or by the assistance of an LTE network. In addition to ProSe discovery, a ProSe-enabled UE may act as a relay between two other ProSe-enabled UEs in its proximity or between a ProSe-enabled UE in its proximity and the LTE network, to provide ProSe communication therebetween. However, according to the 3GPP Technical Report (TR) 23.713, a ProSe-enabled UE which acts as a relay (referred to as a relay UE herein) is first required to connect to an LTE network and request for radio resources for use in ProSe communication, and is also required to always transmit a Device-to-Device (D2D) Synchronization Signal (D2DSS) for allowing another ProSe-enabled UE which is out of service of the LTE network (referred to as a remote UE) to be able to transmit data to the LTE network via the relay UE. As a result, relay UEs may suffer from serious power consumption due to D2DSS transmission. Moreover, the resource utilization of LTE networks may be inefficient since there may be situations where the requested radio resources have been allocated, but there are no remote UE requests to use ProSe communication.

BRIEF SUMMARY OF THE APPLICATION

In a first aspect of the application, a mobile communication device located within a radio signal coverage of a service network to serve as a relay User Equipment (UE) for Proximity-based Service (ProSe) UE-to-network relay is provided. The mobile communication device comprises a wireless transceiver and a controller. The wireless transceiver is configured to perform wireless transmission and reception to and from the service network and a remote UE which is located out of the radio signal coverage of the service network. The controller is configured to transmit a Device-to-Device (D2D) Synchronization Signal (D2DSS) to the remote UE via the wireless transceiver in response to receiving a relay discovery message from the remote UE via the wireless transceiver, and request radio resource allocation from the service network for the remote UE via the wireless transceiver in response to receiving a Direct Communication Request message from the remote UE via the wireless transceiver.

In a second aspect of the application, a method for ProSe UE-to-network relay, executed by a relay UE located within a radio signal coverage of a service network, is provided. The method comprises the steps of: transmitting a D2DSS to a remote UE which is located out of the radio signal coverage of the service network, in response to receiving a relay discovery message from the remote UE; and requesting radio resource allocation from the service network for the remote UE in response to receiving a Direct Communication Request message from the remote UE.

In a third aspect of the application, a mobile communication device, located out of a radio signal coverage of a service network to serve as a remote UE for ProSe UE-to-network relay is provided. The mobile communication device comprises a wireless transceiver and a controller. The wireless transceiver is configured to perform wireless transmission and reception to and from one or more relay UEs which are located within the radio signal coverage of the service network. The controller is configured to receive one or more D2DSSs from the one or more relay UEs via the wireless transceiver in response to transmitting a relay discovery message to the one or more relay UEs via the wireless transceiver, select one of the relay UEs according to the DSDSSs, and transmit a Direct Communication Request message to the selected relay UE via the wireless transceiver to establish a connection with the selected relay UE for ProSe UE-to-network relay.

In a fourth aspect of the application, a method for ProSe UE-to-network relay, executed by a remote UE located out of a radio signal coverage of a service network is provided. The method comprises the steps of: receiving one or more D2DSSs from the one or more relay UEs which are located within the radio signal coverage of the service network, in response to transmitting a relay discovery message to the one or more relay UEs; selecting one of the relay UEs according to the DSDSSs; and transmitting a Direct Communication Request message to the selected relay UE to establish a connection with the selected relay UE for ProSe UE-to-network relay.

Other aspects and features of the invention will become apparent to those with ordinary skill in the art upon review of the following descriptions of specific embodiments of the mobile communication devices and methods for ProSe UE-to-network relay.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
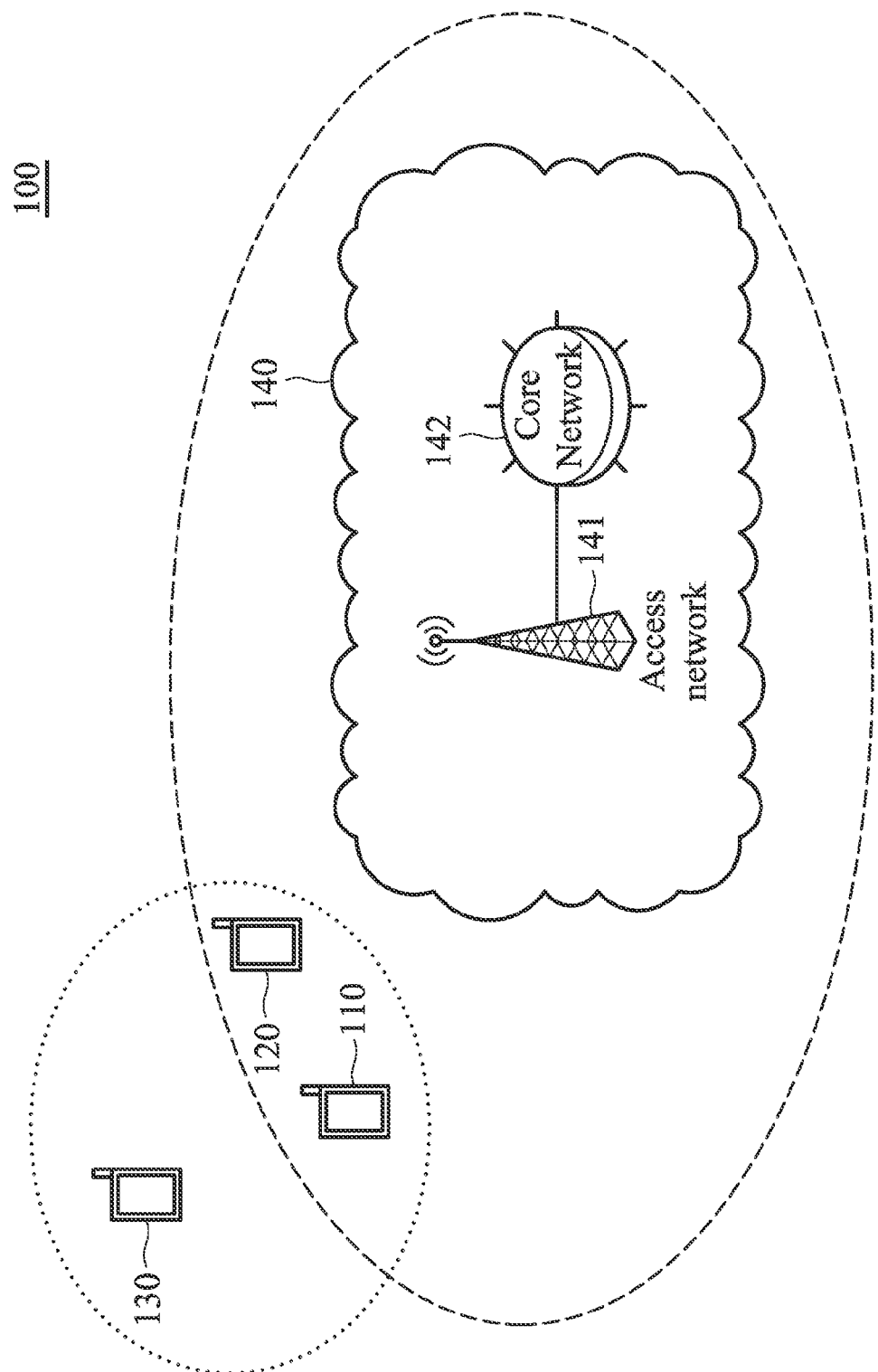
FIG. 1 is a block diagram of a wireless communication environment according to an embodiment of the application.

FIG. 1 is a block diagram of a wireless communication environment according to an embodiment of the application. The wireless communication environment 100 comprises three mobile communication devices 110-130 and a service network 140, wherein the mobile communication devices 110 and 120 are located within the radio signal coverage of the service network 140 (denoted with a dashed ellipse in FIG. 1) and wirelessly connected to the service network 140 for obtaining mobile services, including the Proximity-based Service (ProSe). The mobile communication device 130 is located out of the radio signal coverage of the service network 140 but within the range of wireless communications with the mobile communication devices 110 and 120 (denoted with a dotted circle in FIG. 1) (or may be referred to as being in proximity to the mobile communication devices 110 and 120). All of the mobile communication devices 110-130 are ProSe-enabled UEs, in which the mobile communication devices 110 and 120 are referred to as relay UEs (as they are at in-service area of the service network 140) while the mobile communication device 130 is referred to as a remote UE (as it is at out-of-service area of the service network 140). In addition, the mobile communication devices 110 and 120 may each serve as a relay to provide ProSe communication between the mobile communication device 130 and the service network 140. Each of the mobile communication devices 110-130 may be a feature phone, a smartphone, a panel Personal Computer (PC), a laptop computer, or any computing device supporting the wireless technology utilized by the service network 140.

The service network 140 is a ProSe-enabled network, such as an LTE network, LTE-A network, or TD-LTE network. Specifically, the service network 140 comprises an access network 141 and a core network 142, wherein the access network 141 is responsible for processing radio signals, terminating radio protocols, and connecting the mobile communication devices 110 and 120 with the core network 142, while the core network 142 is responsible for performing mobility management, network-side authentication, and interfaces with public/external networks (e.g., the Internet). Each of the access network 141 and the core network 142 may comprise one or more network nodes for carrying out said functions. For example, the access network 141 may be an Evolved-UTRAN (E-UTRAN) which includes at least an evolved NB (eNB) (e.g., a home eNB, macro BS, or pico BS), and the core network 142 may be an Evolved Packet Core (EPC) which includes a Home Subscriber Server (HSS), Mobility Management Entity (MME), Serving Gateway (S-GW), Packet Data Network Gateway (PDN-GW or P-GW), Secure User Plane Location (SUPL) Location Platform (SLP), and ProSe function node, etc.

Although not shown, the core network 142 may also be connected to a public safety Access Stratum (AS) which provides services regarding public safety. For example, the public safety AS may serve as a control center or report collecting center for emergencies, such as large scale natural disasters, power cuts, etc.

Figure 2:
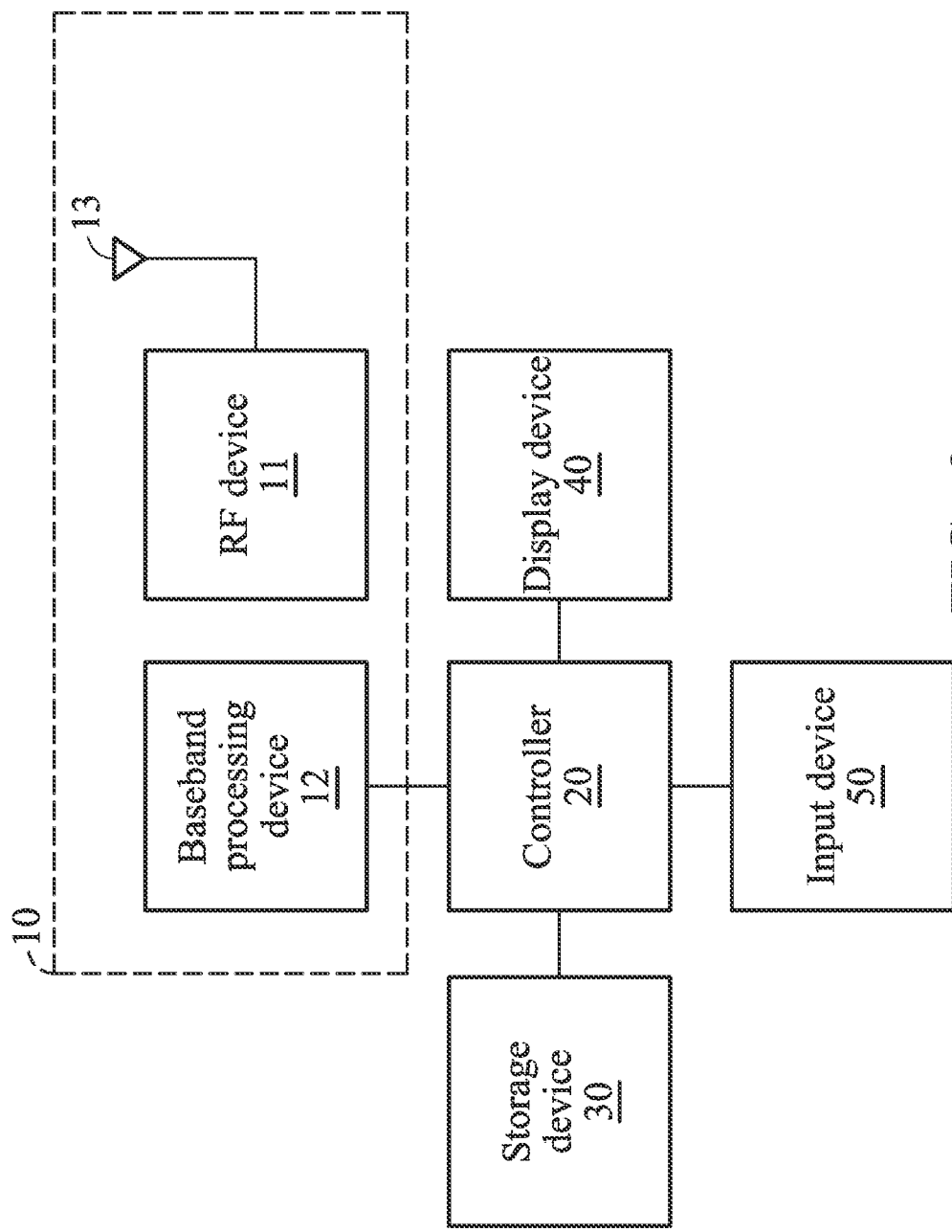
FIG. 2 is a block diagram illustrating a mobile communication device according to an embodiment of the application.

FIG. 2 is a block diagram illustrating a mobile communication device according to an embodiment of the application. The mobile communication device may be any one of the mobile communication devices 110~130. It comprises a wireless transceiver 10, a controller 20, a storage device 30, a display device 40, and an input device 50. The wireless transceiver 10 is configured to perform wireless transmission and reception to and from the service network 140 and other nearby mobile communication devices. The wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technology, wherein the radio frequency may be 900 MHz, 2100 MHz, or 2.6 GHz utilized in LTE/LTE-A/TD-LTE technology, or another radio frequency, such as an unlicensed frequency band (e.g., 2.4 GHz) or a licensed frequency band for another wireless technology.

The controller 20 may be a general-purpose processor, a Micro Control Unit (MCU), an application processor, a Digital Signal Processor (DSP), or the like, for controlling the wireless transceiver 10 for wireless communications with the service network 140 and other nearby mobile communication devices, storing and retrieving data to and from the storage device 30, sending a series of frame data (e.g. representing text messages, graphics, images, etc.) to the display device 40, receiving signals from the input device 50. In particular, the controller 20 coordinates the aforementioned operations of the wireless transceiver 10, the storage device 30, the display device 40, and the input device 50 for performing the method for ProSe UE-to-network relay.

In another embodiment, the controller 20 may be incorporated into the baseband processing device 12, serving as a baseband processor.

The storage device 30 may be a memory, such as a FLASH memory or a Non-volatile Random Access Memory (NVRAM), or a magnetic storage device, such as a hard disk or a magnetic tape, or an optical disc, or any combination thereof for storing instructions and/or program code of applications and/or communication protocols.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MMI) for interaction with users.

It should be understood that the components described in the embodiment of FIG. 2 are for illustrative purposes only and are not intended to limit the scope of the application.

Figure 3:
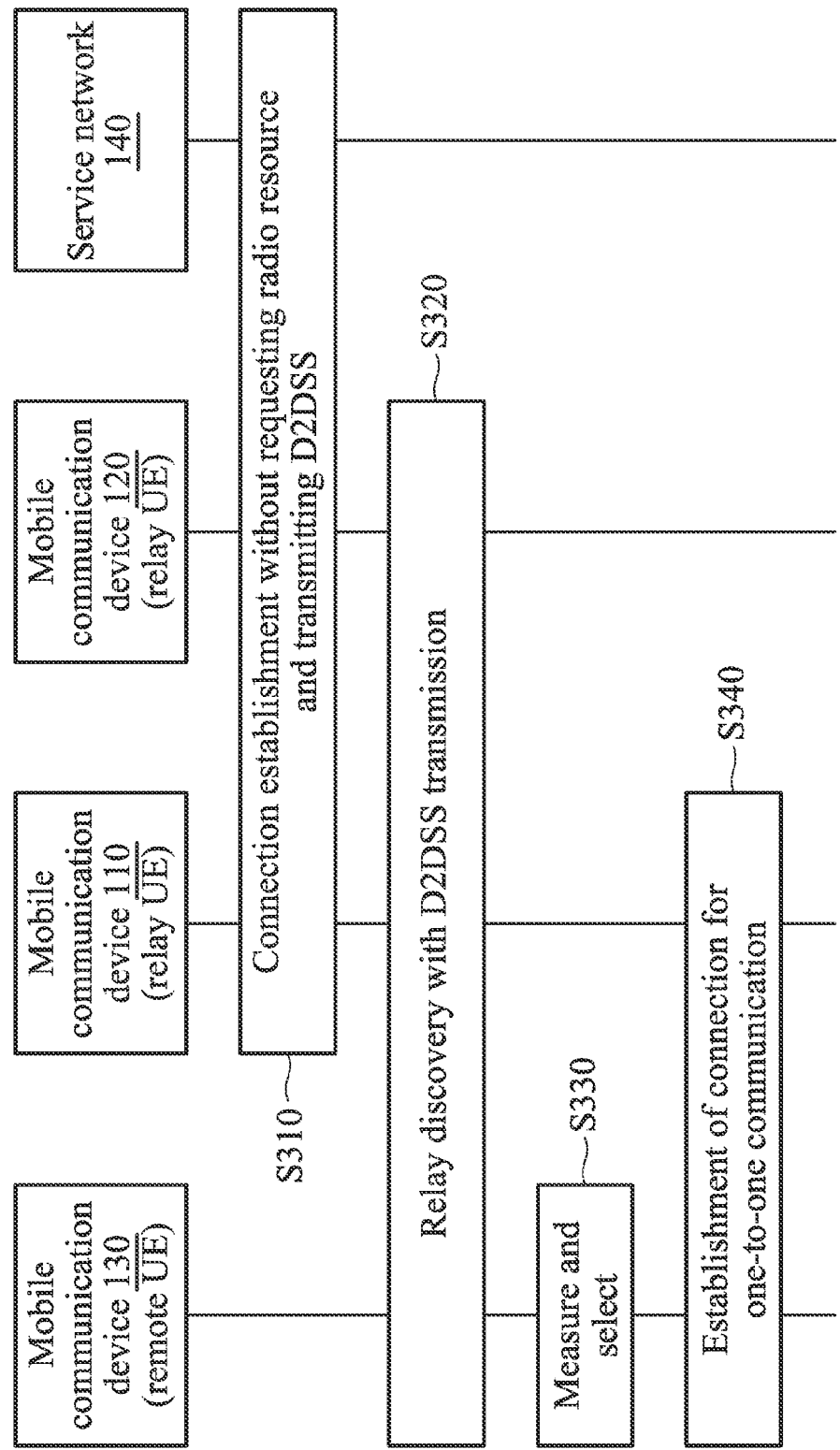
FIG. 3 is a message sequence chart illustrating the ProSe UE-to-network relay according to an embodiment of the application.

FIG. 3 is a message sequence chart illustrating the ProSe UE-to-network relay according to an embodiment of application. To begin, both the mobile communication devices 110 and 120 perform a connection establishment procedure with the service network 140 without requesting any radio resource for ProSe UE-to-network relay and transmitting a D2DSS (step S310). Specifically, both the mobile communication devices 110 and 120 indicate, through the connection establishment procedure, to the service network 140 of that they are relays for ProSe UE-to-network relay. The connection establishment procedure may include an attach procedure and/or setup of a Packet Data Network (PDN) connectivity.

Next, the mobile communication device 130 performs a relay discovery procedure to look for relay UEs in its proximity (step S320). Specifically, the mobile communication device 130 broadcasts a relay discovery message, and both the mobile communication devices 110 and 120 start transmitting a D2DSS for a predetermined period of time in response to receiving the relay discovery message. For example, each of the mobile communication devices 110 and 120 may start a guard timer to count the predetermined period of time, and stop the transmission of the D2DSS if no Direct Communication Request message is received from the mobile communication device 130 before the guard timer expires.

Figure 4:
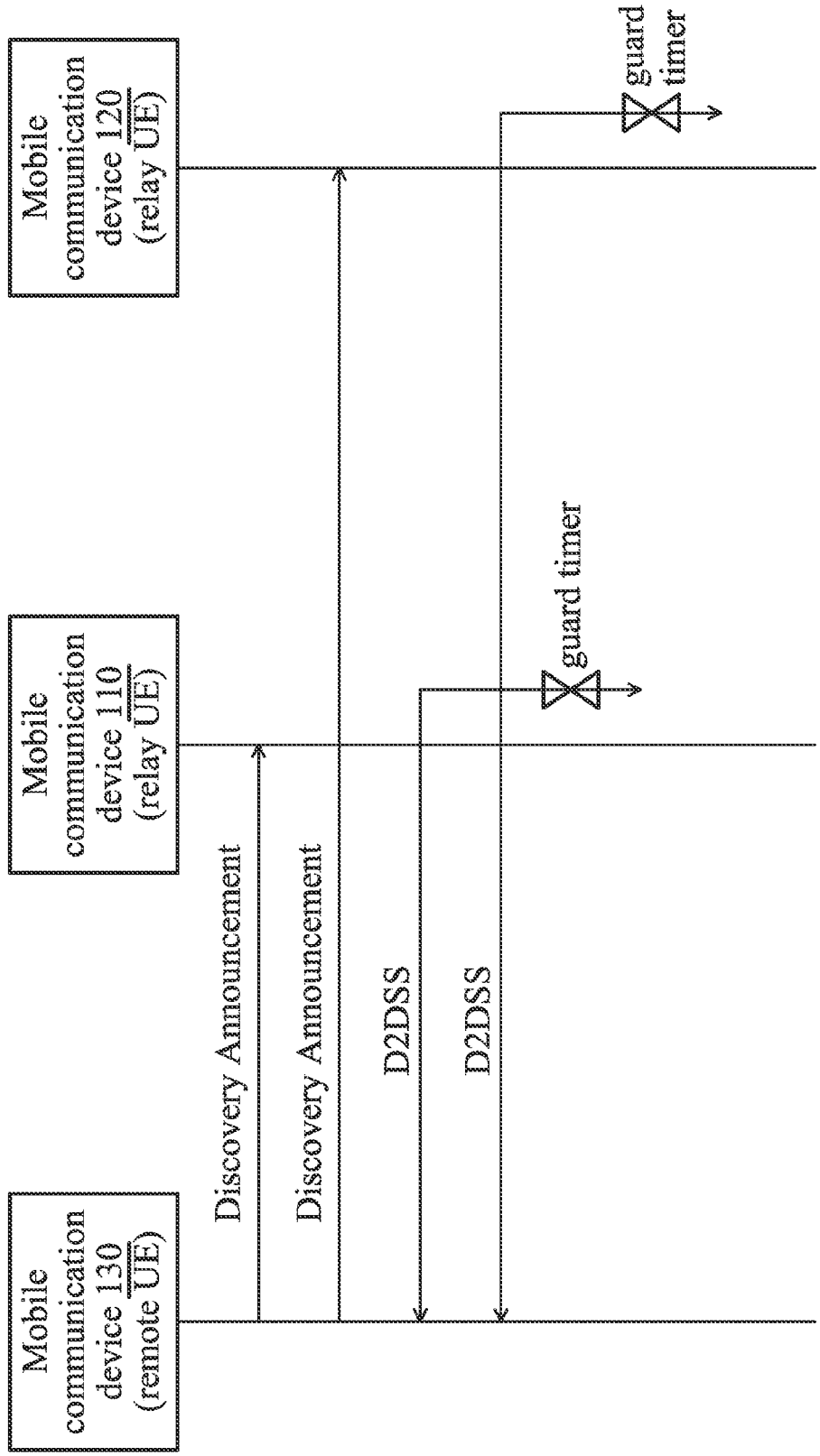
FIG. 4 is a message sequence chart illustrating Model A discovery according to the embodiment of FIG. 3.

In one embodiment, the relay discovery procedure may be a Model A discovery as shown in FIG. 4, wherein the relay discovery message is a Discovery Announcement message and the mobile communication devices 110 and 120 do not need to reply to the mobile communication device 130 when receiving the Discovery Announcement message. The mobile communication devices 110 and 120 just start the D2DSS transmission with the guard timer in response to receiving the Discovery Announcement message.

Figure 5:
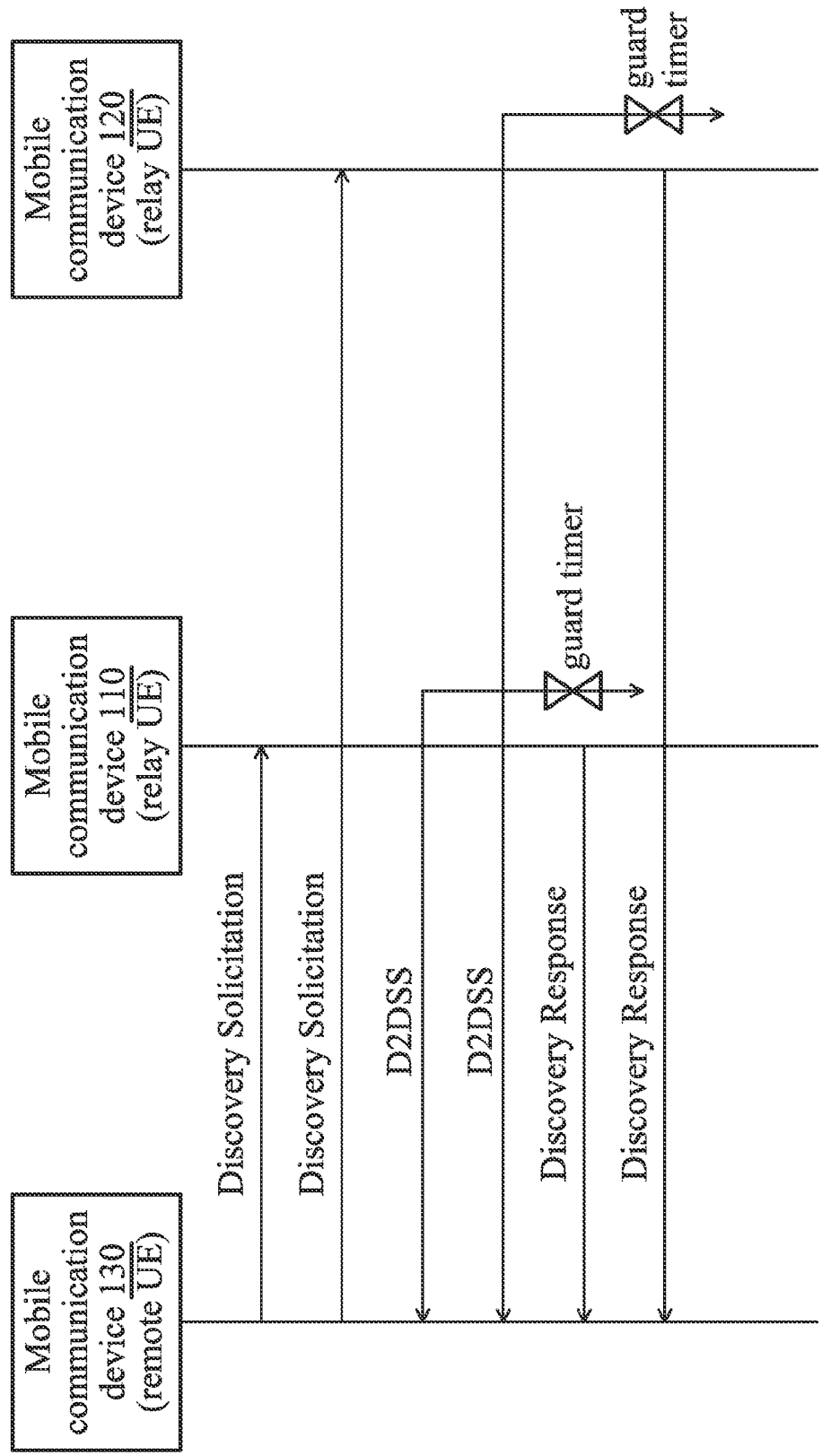
FIG. 5 is a message sequence chart illustrating Model B discovery according to the embodiment of FIG. 3.

In another embodiment, the relay discovery procedure may be a Model B discovery as shown in FIG. 5, wherein the relay discovery message is a Discovery Solicitation message and each of the mobile communication devices 110 and 120 replies to the mobile communication device 130 with a Discovery Response message when receiving the Discovery Solicitation message. Although it is shown in FIG. 5 that each of the mobile communication devices 110 and 120 starts the D2DSS transmission with a respective guard timer before transmitting the Discovery Response message, the mobile communication devices 110 and 120 may alternatively choose to start the D2DSS transmissions with the guard timers after transmitting the Discovery Response message. Please note that, in Model B discovery, each of the mobile communication devices 110 and 120 may determine whether it wants to be a relay for the mobile communication device 130 when receiving the Discovery Solicitation message, and only transmit the D2DSS and the Discovery Response message if it wants to be a relay.

Referring back to FIG. 3, the mobile communication device 130 subsequently measures the received signal strengths or qualities of the received D2DSSs and then selects one of the mobile communication devices 110 and 120 with the best received signal strength or quality (step S330). Specifically, the received signal strength or quality of a D2DSS may refer to the Received Signal Strength Indication (RSSI), Signal-to-Noise Ratio (SNR), Adjacent Channel Interference (ACI), Packet Error Rate (PER), or Bit Error Rate (BER) of the D2DSS.

After that, the mobile communication device 130 performs establishment of connection for one-to-one communication with the selected mobile communication device (step S340). In this embodiment, it is assumed that the mobile communication device 110 is the one with the best received signal strength or quality of D2DSS, and is selected in step S330.

Once the one-to-one communication is established between the mobile communication devices 110 and 130, the mobile communication device 110 serves as a relay to forward unicast traffic between the mobile communication device 130 and the service network 140.

Figure 6:
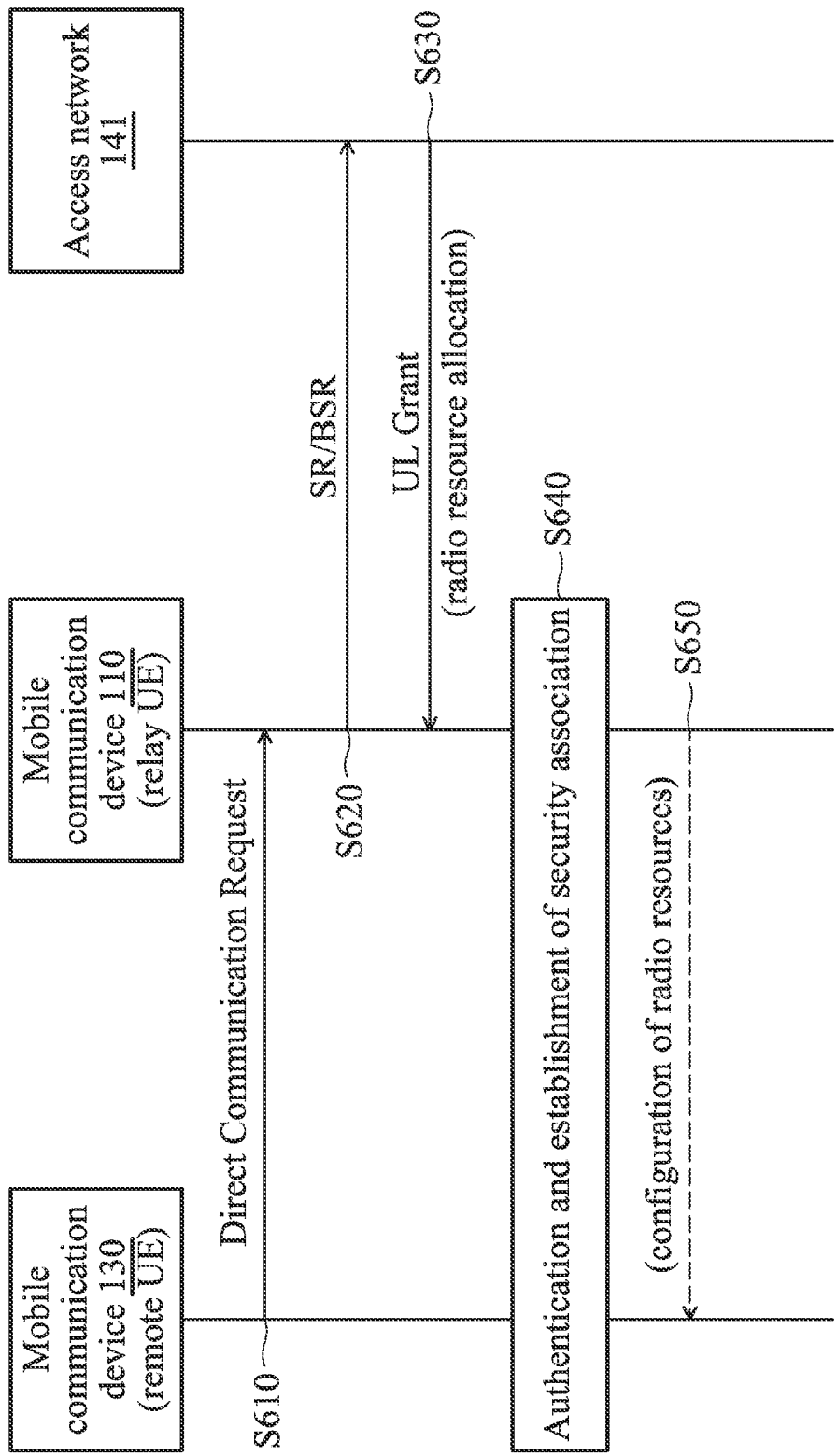
FIG. 6 is a message sequence chart illustrating the establishment of connection for one-to-one communication according to the embodiment of FIG. 3.

FIG. 6 is a message sequence chart illustrating the establishment of connection for one-to-one communication according to the embodiment of FIG. 3. The mobile communication device 130 transmits a Direct Communication Request message to the mobile communication device 110 (step S610). In response to receiving the Direct Communication Request, the mobile communication device 110 requests radio resource allocation from the service network 140 for the mobile communication device 130. Specifically, the mobile communication device 110 transmits a Scheduling Request (SR) message or a Buffer Status Report (BSR) message to the access network 141 (step S620), and receives an Uplink (UL) Grant message including configurations of allocated radio resources from the access network 141 (step S630). Subsequently, the mobile communication device 110 performs authentication and establishment of security association with the mobile communication device 130 (step S640). Specifically, the mobile communication device 110 first initiates mutual authentication with the mobile communication device 130 and then indicates the establishment of the secure layer-2 link over PC5 (which is an interface between UEs, specified in 3GPP TR23.703, sec. 4.3.2). Next, the mobile communication device 110 may optionally transmit a message including the configuration of the allocated radio resource in step S630 to the mobile communication device 130 (step S650). However, if the mobile communication devices 110 and 130 decide to communicate through unlicensed frequency band, step S650 may be omitted. In one embodiment, the message in step S650 may be a Radio Resource Control (RRC) Reconfiguration Request message.

In view of the forgoing embodiment of FIG. 3, it will be appreciated that the present application realizes improved ProSe UE-to-network relay by allowing the relay UEs to transmit the D2DSS only in a limited period of time and to request for network resources only when receiving a Direct Communication Request message from a remote UE. Advantageously, this greatly reduces the power consumption of relay UEs due to D2DSS transmission and improves the resource utilization of LTE networks.

It should be noted that, regarding other detailed description regarding the ProSe UE-to-network relay in the embodiment of FIG. 3, reference may be made to the 3GPP TR 23.713 and 36.843.

While the application has been described by way of example and in terms of preferred embodiment, it is to be understood that the application is not limited thereto. Those who are skilled in this technology can still make various alterations and modifications without departing from the scope and spirit of this application. Therefore, the scope of the application shall be defined and protected by the following claims and their equivalents.

What is claimed is:

1. A mobile communication device, located within a radio signal coverage of a service network to serve as a relay User Equipment (UE) for Proximity-based Service (ProSe) UE-to-network relay, comprising:
    a wireless transceiver, configured to perform wireless transmission and reception to and from the service network and a remote UE which is located out of the radio signal coverage of the service network; and
    a controller, configured to transmit a Device-to-Device (D2D) Synchronization Signal (D2DSS) to the remote UE via the wireless transceiver in response to receiving a relay discovery message from the remote UE via the wireless transceiver, and request radio resource allocation from the service network for the remote UE via the wireless transceiver in response to receiving a Direct Communication Request message from the remote UE via the wireless transceiver.

2. The mobile communication device of claim 1, wherein, prior to receiving the relay discovery message from the remote UE, the controller is further configured to establish a connection to the service network via the wireless transceiver without requesting any radio resource.

3. The mobile communication device of claim 1, wherein, prior to receiving the relay discovery message from the remote UE, the controller is further configured to not transmit the D2DSS.

4. The mobile communication device of claim 1, wherein the controller is further configured to periodically transmit the D2DSS during a predetermined period of time subsequent to receiving the relay discovery message, and stop the transmission of the D2DSS in response to not receiving the Direct Communication Request message before the predetermined period of time elapses.

5. The mobile communication device of claim 1, wherein the controller is further configured to transmit a relay discovery response message to the remote UE via the wireless transceiver before or after transmitting the D2DSS, in response to receiving the relay discovery message.

6. A method for Proximity-based Service (ProSe) User Equipment (UE)-to-network relay, executed by a relay UE located within a radio signal coverage of a service network, the method comprising:
    transmitting a Device-to-Device (D2D) Synchronization Signal (D2DSS) to a remote UE which is located out of the radio signal coverage of the service network, in response to receiving a relay discovery message from the remote UE; and
    requesting radio resource allocation from the service network for the remote UE in response to receiving a Direct Communication Request message from the remote UE.

7. The method of claim 6, further comprising:
    establishing a connection to the service network without requesting any radio resource, prior to receiving the relay discovery message from the remote UE.

8. The method of claim 6, further comprising:
    not transmitting the D2DSS, prior to receiving the relay discovery message from the remote UE.

9. The method of claim 6, further comprising:
    periodically transmitting the D2DSS during a predetermined period of time subsequent to receiving the relay discovery message; and
    stopping the transmission of the D2DSS in response to not receiving the Direct Communication Request message before the predetermined period of time elapses.

10. The method of claim 6, further comprising:
    transmitting a relay discovery response message to the remote UE before or after transmitting the D2DSS, in response to receiving the relay discovery message.

* * * * *